Figure 1:
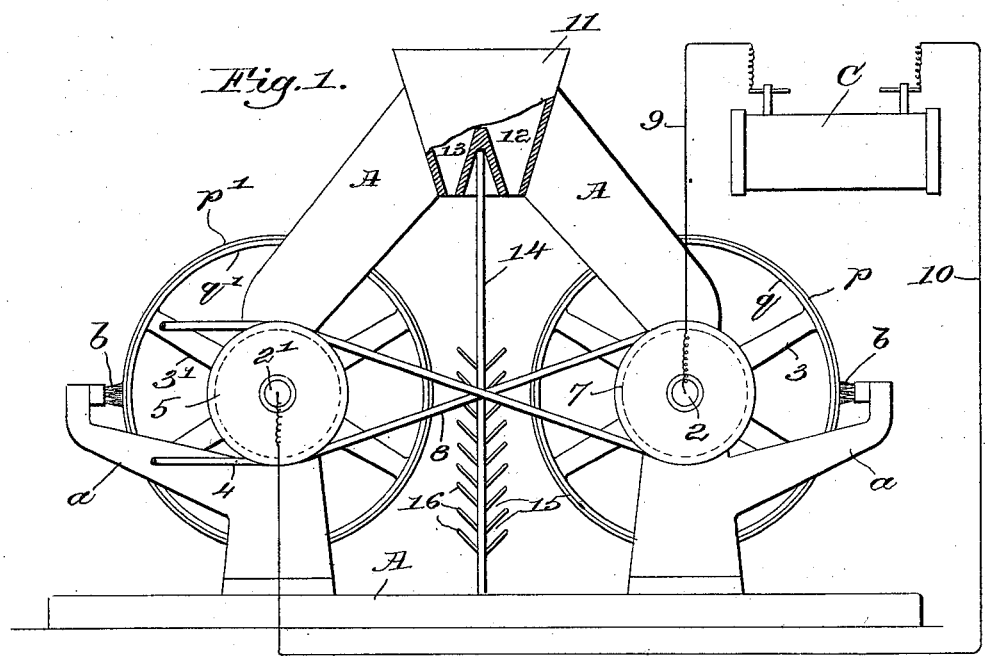

No. 685,508. Patented Oct. 29, 1901.
C. E. DOLBEAR.
METHOD OF SEPARATING VALUABLE METALS FROM METAL BEARING MATERIAL.
(Application filed June 25, 1900.)
(No Model.)

Witnesses.
Thomas J. Drummond,
Edward H. Allen.

Inventor.
Clinton E. Dolbear,
by Crosby Gregory.
Attys.

UNITED STATES PATENT OFFICE.

CLINTON E. DOLBEAR, OF HYDEPARK, MASSACHUSETTS, ASSIGNOR TO AMERICAN MINING AND METAL EXTRACTION COMPANY, OF PORTLAND, MAINE, AND BOSTON, MASSACHUSETTS, A CORPORATION OF MAINE.

METHOD OF SEPARATING VALUABLE METALS FROM METAL-BEARING MATERIAL.

SPECIFICATION forming part of Letters Patent No. 685,508, dated October 29, 1901.

Application filed June 25, 1900. Serial No. 21,406. (No specimens.)

*To all whom it may concern:*

Be it known that I, CLINTON E. DOLBEAR, a citizen of the United States, and a resident of Hydepark, county of Norfolk, State of Massachusetts, have invented an Improvement in Methods of Separating the Valuable Metals from Metal-Bearing Material, of which the following description, in connection with the accompanying drawings, is a specification, like characters on the drawings representing like parts.

My invention relates to a novel method for separating from auriferous, argentiferous, and other metalliferous material those particles which are conductors of electricity, and by this method I am enabled to separate out from crushed or pulverized ore or from sand or similar material the gold, silver, or other metallic particles and also such conductive particles as are of value.

It is a well-known fact that metals are good conductors of electricity, and this is also true of various valuable substances which it is desirable to separate from the material in which they occur in nature. When a conductive particle is brought into contact with an electrified body, the conductive particle immediately assumes a charge similar in kind to that of the electrified body, with the result that the conductive particle is repelled from the electrified body; but non-conductive particles, such as sand and similar substances with which the valuable metals are usually found commingled, when brought into contact with the same electrified body are unable to discharge the electricity with which they are charged and to assume a charge similar in kind to that of the electrified body, and hence will remain under the attracting influence of the electrified body.

I make use of the foregoing principle in carrying out the method herein by passing the material to be treated in a finely-divided form electrically between opposing electrodes highly charged with electricity of opposite kinds. The material being electrically in a neutral state is acted on by induction and as an entirety is attracted toward one of the electrodes. As soon, however, as the different particles of the material contact with the said electrode different effects are produced upon the conductive and non-conductive particles of the material, the conductive particles immediately discharging their charge of electricity, assuming a charge of electricity the same in kind as that of the electrode and being at once repelled from the said electrode and drawn toward the opposing electrode. On the other hand, the non-conductive particles, being unable to discharge their electricity, remain under the attractive influence of said electrode and repellent influence of the opposite electrode. This results in the desired separation of the conductive particles, which are the particles of the valuable metals, or such other substances that it is desired to obtain from the non-conductive particles of sand, silica, or other substances forming the balance of the ore or material. The conductive particles are thus repelled by the well-known law that bodies charged with like electricity repel each other, while the non-conductive particles, unable to discharge their induced charge, either adhere to the electrode or are carried by gravity out of the sphere of its influence.

An essential feature of this method and one necessary for its satisfactory working is that the material be fed into the apparatus nearer to the electrode to which it is to be attracted than to the other.

For the purpose of carrying out my method I have illustrated a simple form of apparatus in the accompanying drawings; but I desire it to be understood that various forms of apparatus may be used for practicing this method, and I do not desire to limit myself in any way to the particular form of apparatus shown.

Figure 2:
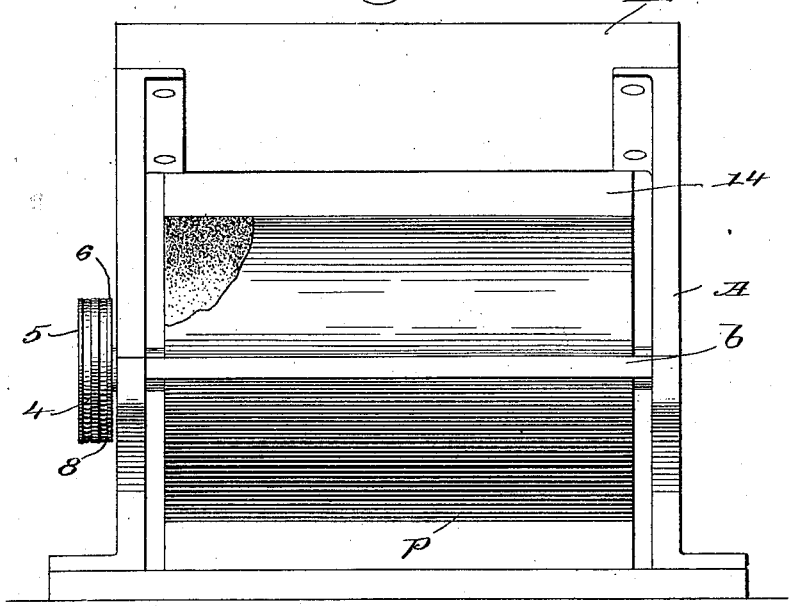

Figure 1 is a side elevation, with some of the parts broken away, of such an apparatus; and Fig. 2 is an end elevation of the apparatus shown in Fig. 1.

Although my method may be carried out in an apparatus provided with but one electrode, the ground or some distant point constituting the other electrode, yet such an apparatus would not be very effective, because the influence of a single electrode would not be sufficient to effectively attract and repel the non-conductive and conductive particles, respectively, to effect their desired separation.

I have shown for convenience an apparatus provided with two electrodes, herein illustrated as metallic surfaces $p$ $p'$, mounted upon cylindrical backings $q$ $q'$, connected by arms 3 3' with suitable shafts 2 2', the said shafts being supported in a suitable manner in a frame A. The electrodes $p$ $p'$ may be charged with electricity by any suitable means, it only being essential that they have a large difference of potential, and as a convenient means for thus charging them I have illustrated an induction-coil, preferably a Ruhmkorff coil, which is shown in the drawings at C, the said coil being connected with the electrodes $p$ $p'$ by means of wires 9 10, passing to the shafts 2 2', which are electrically connected in turn with the electrodes $p$ $p'$. The shaft 2' is provided with a pulley 5, fast thereon, which is driven by a belt 4 from any suitable source. A similar pulley 7, fast upon the shaft 2, is driven by the belt 8 from the pulley 6, also fast on the shaft 2'. The shafts 2 2' are suitably insulated from both the frame A and the pulleys 5, 6, and 7. The upper portion of the frame A converges and supports a suitable hopper 11, divided into two compartments 12 and 13, each having an aperture at its bottom. A glass plate 14 extends vertically from a point centrally between the two apertures of the hopper to the base of the apparatus. Suitable means for catching and retaining the conductive or metallic particles are provided on each side of the plate 14 and are herein shown as pockets 15, formed by strips 16, inclined to the glass plate. Suitable brushes $b$, supported on arms $a$, are shown and may be used to clear the electrode of any non-conductive particles which may adhere thereto.

The various steps of the method are as follows: Assuming that the electrodes are charged with electricity of considerable density, but of different kinds, and that the hopper 11 has been filled with the finely-divided material, from which it is desired to separate the valuable product consisting of conductive particles, by the action of gravity the said material passes in two streams, one on each side of the glass plate, electrically between the opposing electrodes. As each stream falls from its respective compartment in the hopper it passes by the action of gravity within the influence of one of the opposing electrodes, with the following result: Each electrode acts by induction on the stream nearest it, or, to be more accurate, on each of the commingled particles composing said stream, and induces in that portion of each particle nearest the electrode a charge of electricity opposite in kind to the electrode. The result of this action is that each particle is attracted toward that electrode which has induced in it this charge of electricity, according to the well-known principle that bodies charged with opposite kinds of electricity attract each other. The attracting influence of one electrode is augmented by the repelling influence of the opposite electrode, which, as before stated, is charged with the opposite kind of electricity from the first-named electrode, and hence will produce opposite effects upon the said particle. As soon as the various particles of conductive and non-conductive material come in contact with either of the electrodes, a different effect is produced on the conductive particles from what is produced on the non-conductive particles. The conductive particles at the instant of contact with the electrode discharge their induced charge of electricity opposite in kind to the electrode with which they contact and assume a charge of the same kind of electricity as said electrode. This results in their being repelled from the said electrode, according to the law previously expressed that bodies charged with the same kind of electricity repel each other. This repelling force is augmented by the influence of the opposing electrode, for as soon as each conductive particle has become charged with the same kind of electricity as the first-named electrode it has assumed a charge which is opposite in kind to the opposing electrode. Each particle, therefore, is repelled from the electrode with which it has contacted and attracted toward the opposing electrode, and this combined repelling and attracting force is sufficient to throw said conductive particles against the glass plate, where they are caught and retained by one of the pockets thereon. The non-conductive particles, however, are unable to discharge their induced charge of electricity, because of their non-conductive properties, and hence they will remain under the attracting influence of the electrode with which they have contacted and either be carried by said electrode away from the glass plate 14 or fall under the influence of gravity to the base of the machine.

It will thus be seen that I have provided a simple and efficacious process for separating out those particles which are electrically conductive, such as the valuable metals of gold and silver, when in a finely-divided state, from the materials in which they occur in nature by bringing the said material to be treated within the influence of a powerful static field, whereby such material is acted upon inductively, the conductive or metallic particles being repelled after contact with the electrode, while the non-conductive or silicious or like particles fall by gravity or adhere to the electrode. It will be evident that this process is not dependent upon the precise form of apparatus or upon any particular form of electrode. It is unimportant whether the electrode is stationary or movable or whether it is a cylindrical or plane surface. Neither is it important by what means the electrodes are charged, it only being necessary that some form of electrode suitably charged with electricity of considerable density be employed.

Having described my invention, what I claim, and desire to secure by Letters Patent, is—

1. The method of separating commingled conductors and non-conductors of electricity, which consists in subjecting them thus commingled to the influence of an electrode highly charged with electricity, whereby, after contact therewith, the conductors are repelled from said electrode while the non-conductors remain under the attracting influence of said electrode, and separately collecting the thus-separated materials.

2. The method of separating commingled particles of valuable metal and silicious or similar material, which consists in causing them, in their commingled state, to pass within the influence of a highly-charged electrode, whereby they are together attracted to the electrode and then separation is caused by the metallic particles being repelled from the electrode while the non-metallic particles remain within its attracting influence, and separately collecting the thus-separated materials.

3. The method of separating a valuable metal from metalliferous material, which consists in passing the metalliferous material in a finely-divided form within the sphere of an electrode highly charged with electricity, whereby the metalliferous material is attracted to the electrode until it contacts with the same when the metallic or conductive particles becoming charged with the same kind of electricity as the electrode are repelled therefrom, and the silicious or other non-conductive particles remain in contact with the electrode or fall therefrom by the action of gravity, and separately collecting the thus-separated materials.

4. The method of separating commingled conductors and non-conductors of electricity, which consists in feeding the commingled mass on opposite sides of a median plane lying between electrodes charged with electricity of opposite kinds, and in the immediate vicinity of said electrodes whereby both the conductors and non-conductors are attracted toward said electrodes, and after contact therewith the conductors are repelled from that electrode with which they have made contact, while the non-conductors remain under the attracting influence of the said electrode, and separately collecting the thus-separated materials.

5. The method of separating commingled particles of conductors and non-conductors of electricity, which consists in providing an electrode with a charge of electricity, passing the commingled particles into contact with the electrode, whereby after contact the conductive particles are repelled from electrode, while the non-conductive particles remain unaffected thereby, and separately collecting the thus-separated particles.

6. The method of separating gold or silver particles from the silicious or other particles in mill-pulp, or other metalliferous material, which consists in, first, charging opposing electrodes with electricity of opposite kinds; second, subjecting the metalliferous material to the action of said electrodes, whereby the said particles are attracted toward the nearest electrode, and after contact therewith the gold or silver particles are repelled from, while the silicious particles remain under the attracting influence of the electrode with which they have made contact, and, third, impeding the repelled particles in their passage from the repellent electrode toward the attracting-electrode, and separately collecting the thus-separated materials.

7. The method of separating gold or other metal particles from the silicious or similar particles in mill-pulp, or other metalliferous material, which consists in passing the metalliferous material between and within the influence of opposing electrodes, charged with electricity of opposite kinds, whereby all the particles of the metalliferous material are attracted toward said electrodes, and after contact therewith the metal particles are repelled from the electrode with which they have made contact, and attracted toward the opposite electrode, while the silicious or similar material remains under the attracting influence of said electrode, and stopping the passage of the repelled particles during their passage from the repellent electrode to the attracting-electrode.

8. The method of separating the conducting and non-conducting particles of metal-bearing substances, which consists in subjecting the mass composed of conducting and non-conducting particles to the action of oppositely-charged electrodes, interposing between said electrodes a non-conducting partition, and retaining in suitably-arranged receptacles the conducting particles repelled from the oppositely-charged electrodes, substantially as described.

In testimony whereof I have signed my name to this specification in the presence of two subscribing witnesses.

CLINTON E. DOLBEAR.

Witnesses:
NATHAN HEARD,
JOHN C. EDWARDS.